(12) United States Patent
Bunting et al.

(10) Patent No.: US 11,815,073 B2
(45) Date of Patent: *Nov. 14, 2023

(54) SHAPE MEMORY ALLOY ACTUATION APPARATUS

(71) Applicant: CAMBRIDGE MECHATRONICS LIMITED, Cambridge (GB)

(72) Inventors: Stephen Matthew Bunting, Cambridge (GB); Andrew Benjamin Simpson Brown, Cambridge (GB); Marc-Sebastian Scholz, Cambridge (GB); James Howarth, Cambridge (GB)

(73) Assignee: CAMBRIDGE MECHATRONICS LIMITED, Cambridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/890,700

(22) Filed: Aug. 18, 2022

(65) Prior Publication Data

US 2022/0403831 A1 Dec. 22, 2022

Related U.S. Application Data

(63) Continuation of application No. 16/960,410, filed as application No. PCT/GB2019/050160 on Jan. 22, 2019, now Pat. No. 11,454,221.

(30) Foreign Application Priority Data

| Jan. 22, 2018 | (GB) | 1801007 |
| Jun. 21, 2018 | (GB) | 1810204 |
| Jul. 16, 2018 | (GB) | 1811621 |

(51) Int. Cl.
*G02B 27/64* (2006.01)
*F03G 7/06* (2006.01)

(52) U.S. Cl.
CPC ........... *F03G 7/065* (2013.01); *F03G 7/0614* (2021.08)

(58) Field of Classification Search
CPC ............................ F03G 7/065; G02B 27/646
See application file for complete search history.

(56) References Cited

U.S. PATENT DOCUMENTS 8,830,335 B2 * 9/2014 Topliss .................... G03B 3/10
359/554
8,866,918 B2 * 10/2014 Gregory ............. H04N 23/6815
348/208.99

(Continued)

FOREIGN PATENT DOCUMENTS

| CN | 107111212 A | 8/2017 |
| GB | 2574871 A | 12/2019 |

(Continued)

OTHER PUBLICATIONS

GB Examination Report dated Jan. 24, 2022 of GB Application GB2011087.0.

(Continued)

*Primary Examiner* — Shafiq Mian
(74) *Attorney, Agent, or Firm* — HALEY GUILIANO LLP

(57) ABSTRACT

Broadly speaking, the present techniques provide specific arrangements of shape memory alloy (SMA) actuator wires in SMA actuation apparatuses. In one arrangement, a single straight shape memory alloy actuator wire may be used, which may be inclined at an acute angle greater than 0 degrees with respect to a plane normal to the movement direction. In another arrangement, two straight lengths of shape memory alloy actuator wire may be used, where the (Continued)

SMA wires may be inclined at an acute angle greater than 0 degrees with respect to a plane normal to the movement direction.

13 Claims, 7 Drawing Sheets

(56) References Cited

U.S. PATENT DOCUMENTS

| | | | |
|---|---|---|---|
| 9,518,566 B2* | 12/2016 | Eddington | F03G 7/065 |
| 2002/0113499 A1 | 8/2002 | Von et al. | |
| 2009/0226691 A1 | 9/2009 | Mankame et al. | |
| 2009/0295986 A1 | 12/2009 | Topliss et al. | |
| 2010/0074607 A1* | 3/2010 | Topliss | G02B 7/005 |
| | | | 60/527 |
| 2013/0002933 A1 | 1/2013 | Topliss et al. | |
| 2014/0055630 A1 | 2/2014 | Gregory et al. | |
| 2015/0135703 A1* | 5/2015 | Eddington | F03G 7/065 |
| | | | 60/528 |
| 2015/0346507 A1* | 12/2015 | Howarth | F03G 7/06 |
| | | | 60/527 |
| 2016/0258425 A1* | 9/2016 | Ladwig | G02B 7/09 |
| 2016/0259178 A1 | 9/2016 | Miller | |
| 2017/0299945 A1 | 10/2017 | Suzuki et al. | |
| 2018/0149142 A1* | 5/2018 | Bunting | G02B 7/08 |
| 2019/0136839 A1* | 5/2019 | Miller | F03G 7/06 |

FOREIGN PATENT DOCUMENTS

| | | |
|---|---|---|
| JP | 2002-130114 A | 5/2002 |
| JP | 2014-010380 A | 1/2014 |
| KR | 10-2013-0026726 A | 3/2013 |
| WO | 2011/104518 A1 | 9/2011 |
| WO | 2012/038703 A2 | 3/2012 |
| WO | 2016/189314 A1 | 12/2016 |
| WO | WO-2016189314 A1 * 12/2016 ............. F03G 7/065 |
| WO | 2019/142005 A1 | 7/2019 |

OTHER PUBLICATIONS

GB Search Report and Examination Report dated Aug. 10, 2018 of GB Application 1810204.6.
GB Search and Examination Report of GB Application 2215125.2 dated Oct. 28, 2022.

* cited by examiner

SHAPE MEMORY ALLOY ACTUATION APPARATUS

CROSS-REFERENCE TO RELATED APPLICATIONS

This application is a continuation of U.S. patent application Ser. No. 16/960,410, filed Jul. 7, 2020, which is a national stage application under 35 U.S.C. § 371 of International Application PCT/GB2019/050160, filed Jan. 22, 2019, which claims priority of GB Patent Applications 1801007.4 filed Jan. 22, 2018, 1810204.6 filed Jun. 21, 2018, and 1811621.0 filed Jul. 16, 2018. The disclosures of which are hereby incorporated by reference herein in their entireties.

The present techniques generally relate to a shape memory alloy (SMA) actuation apparatus in which at least one length of SMA actuator wire drives movement of a movable element with respect to a support structure. In particular, the present techniques are concerned with the arrangement of SMA actuator wires in SMA actuation apparatuses.

According to a first aspect of the present techniques, there is provided a shape memory alloy actuation apparatus comprising: a support structure; a movable element supported on the support structure by a suspension system arranged to guide movement of the movable element along a movement direction with respect to the support structure; a single straight shape memory alloy actuator wire only, wherein the shape memory alloy actuator wire is connected between the movable element and the support structure for driving movement of the movable element relative to the support structure, and is inclined at an acute angle greater than 0 degrees with respect to a plane normal to the movement direction.

The single inclined SMA actuator wire may produce considerable lateral forces, when compared to known arrangements using two, four or eight SMA actuator wires which are generally arranged so that there is some balancing of lateral forces generated by the SMA actuator wires. However, it has been appreciated by analysis and experiment that surprisingly it is possible in the single inclined SMA actuator wire case to adequately counteract these lateral forces by a suitable suspension system, such as flexures or a bearing arrangement, which may comprise at least one bearing comprising bearing surfaces on the support structure and the moveable element and at least one rolling bearing element disposed between the bearing surfaces. This allows the benefit of simplified manufacture and attachment of the single piece of SMA actuator wire.

According to a second aspect of the present techniques, there is provided a shape memory alloy actuation apparatus comprising: a support structure; a movable element supported on the support structure by a suspension system arranged to guide movement of the movable element along a movement direction with respect to the support structure; two straight lengths of shape memory alloy actuator wire each connected by a crimp to the protrusion and connected by a crimp to the support structure for driving movement of the movable element relative to the support structure, the shape memory alloy actuator wires being inclined at an acute angle greater than 0 degrees with respect to a plane normal to the movement direction.

The first and second aspects of the present techniques may be applied to an optical device wherein the movable element is a lens element comprising at least one lens, wherein the movement direction is along an optical axis of the lens element. For example, the SMA actuation apparatus may be a camera in which the support structure has an image sensor mounted thereon and the lens element is arranged to focus an image on the image sensor.

In another non-limiting example, the moveable element may be an image sensor of an optical device, and the SMA actuator wires may be arranged to move the image sensor instead of the lens element.

In general, the SMA actuation apparatus may be any type of device that comprises a static part and a movable part which is movable with respect to the static part.

The shape memory alloy actuation apparatus may be, or may be provided in, any one of the following devices: a smartphone, a camera, a foldable smartphone, a foldable smartphone camera, a foldable image capture device, an array camera, a 3D sensing device or system, a servomotor, a consumer electronic device (including domestic appliances such as vacuum cleaners, washing machines and lawnmowers), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), an audio device (e.g. headphones, headset, earphones, etc.), a security system, a gaming system, a gaming accessory (e.g. controller, headset, a wearable controller, joystick, etc.), a robot or robotics device, a medical device (e.g. an endoscope, inhaler, drug dispenser, etc.), an augmented reality system or device, a virtual reality system or device, a wearable device, a drone (aerial, water, underwater, etc.), an aircraft, a spacecraft, a submersible vessel, a vehicle, an autonomous vehicle (e.g. a driverless car), a tool, a surgical tool, a display screen, and a touchscreen.

Preferred features of the present techniques are set out in the appended dependent claims.

Implementations of the present techniques will now be described, by way of example only, with reference to the accompanying drawings, in which.

Figure 1:
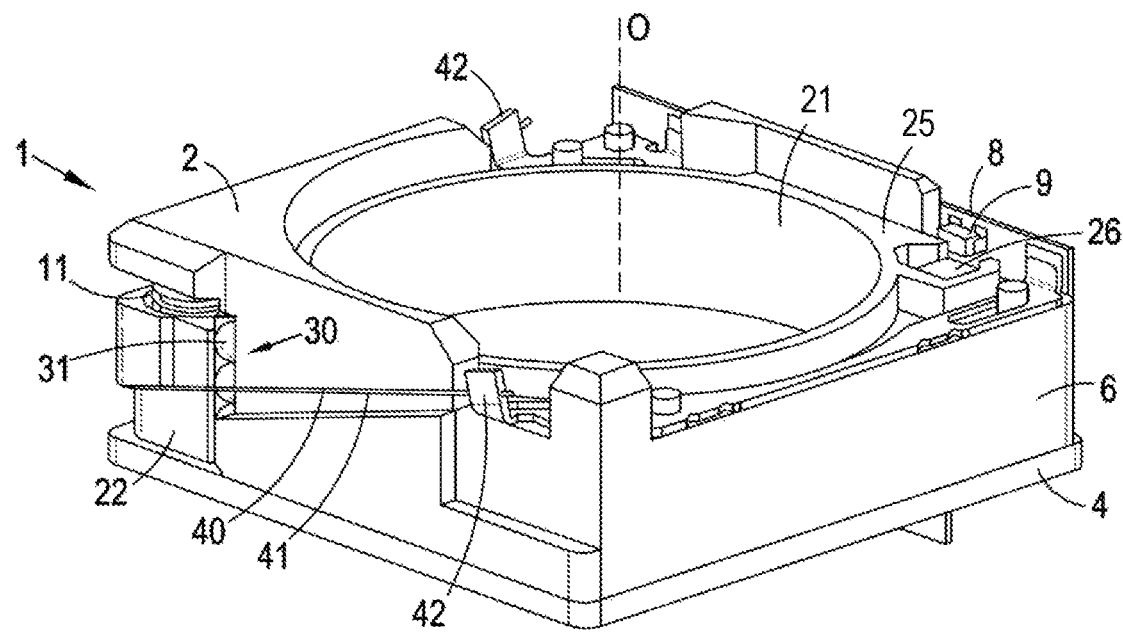
FIG. 1 is a perspective view of a first SMA actuation apparatus.

Broadly speaking, the present techniques provide specific arrangements of SMA actuator wires in SMA actuation apparatuses. In one arrangement, a single straight shape memory alloy actuator wire may be used, which may be inclined at an acute angle greater than 0 degrees with respect to a plane normal to the movement direction. In another arrangement, two straight lengths of shape memory alloy actuator wire may be used, where the SMA wires may be inclined at an acute angle greater than 0 degrees with respect to a plane normal to the movement direction.

It is known to use SMA actuator wires to drive translational movement of a movable element with respect to a support structure. SMA actuator wires have particular advantages in miniature devices and may be applied in a large range of consumer electronic devices including handheld devices, such as cameras and mobile phones.

Such SMA actuator wires may be used for example in an optical device such as a camera for driving translational movement of a camera lens element along its optical axis, for example to effect focusing (autofocus, AF) or zoom. Such cameras may be small and relatively low cost and provide a great deal of functionality, being used not only to take photographs but also for video calls, scanning, object recognition, security etc. Examples of SMA actuation apparatuses that are cameras of this type are disclosed in WO2007/113478, WO2009/056822 and WO2017/134456.

Such SMA actuator wires may similarly be used in an optical device such as a camera for driving translational movement of a camera lens element transverse to the optical axis, for example to provide optical image stabilisation (OIS). Examples of SMA actuation apparatuses that are cameras of this type are disclosed in WO2013/175197 and WO2014/083318.

In WO2007/113478, the movable element is a camera lens element supported on a support structure by a suspension system comprising flexures that guide translational movement along the optical axis. In one example described in WO2007/113478, the SMA actuator wire is a piece of SMA wire connected at its ends to a support structure and hooked over a hook on a camera lens element for driving the translational movement. The straight SMA actuator wires formed by the portions of the piece of SMA wire on either side of the hook extend at an acute angle of greater than 0 degrees to the movement direction parallel to the optical axis, which is referred to herein as an "angled-V arrangement". Angling the SMA actuator wires in this manner away from the movement direction increases the amount of movement compared to an SMA actuator wire extending along the movement direction.

However, the manufacture of such an SMA actuation arrangement with an angled-V arrangement is challenging. During manufacture, the piece of SMA wire must be crimped at its ends and attached to the support structure while the midpoint of the wire must be hooked over the protrusion on the lens element, while maintaining accurate wire length, wire angle and wire exit angle at the crimp. The operation is particularly difficult in arrangements in which the height of the SMA actuation arrangement is minimised in the movement direction, i.e. along the optical axis in the case of WO2007/113478.

With respect to the first aspect of the present techniques, the manufacture of the SMA actuation apparatus may be simplified compared to the angled-V arrangement of WO2007/113478, as there is only a single length of SMA actuator wire and no requirement to hook the SMA actuator wire over a protrusion on the lens element. The single wire is inclined with respect to the movement direction so as to retain the advantage of increased amount of movement compared to an SMA actuator wire extending along the movement direction. This is particularly useful for minimising the height of the SMA actuation apparatus along the movement direction.

With respect to the second aspect of the present techniques, the two lengths of straight SMA actuator wire have a similar overall arrangement to the angled-V arrangement disclosed in WO2007/113478 wherein the two length of SMA actuator wires are portions of a single piece of SMA actuator wire hooked over a protrusion on the movable element. Thus, the present arrangement provides similar advantages to WO2007/113478 in terms of the function of the length of SMA actuator wires. However, the manufacture of the present SMA actuation apparatus may be simplified compared to the angled-V arrangement of WO2007/113478, as the connection of each length by crimps at the movable element means that there is no requirement to hook a piece of SMA actuator wire over a protrusion on the lens element. The two lengths of SMA actuator wire are each inclined with respect to the movement direction so as to retain the advantage of increased amount of movement compared to an SMA actuator wire extending along the movement direction. This is particularly useful for minimising the height of the SMA actuation apparatus along the movement direction.

The shape memory alloy actuation apparatus in accordance with either of the aspects of the present techniques described herein may conveniently be manufactured using the method disclosed in WO2016/189314 using a strut element shaped to comprise a sacrificial strut body and crimp tabs held apart by the sacrificial strut body, wherein the sacrificial strut body holds the crimp tabs apart during assembly and is subsequently removed.

Figure 2:
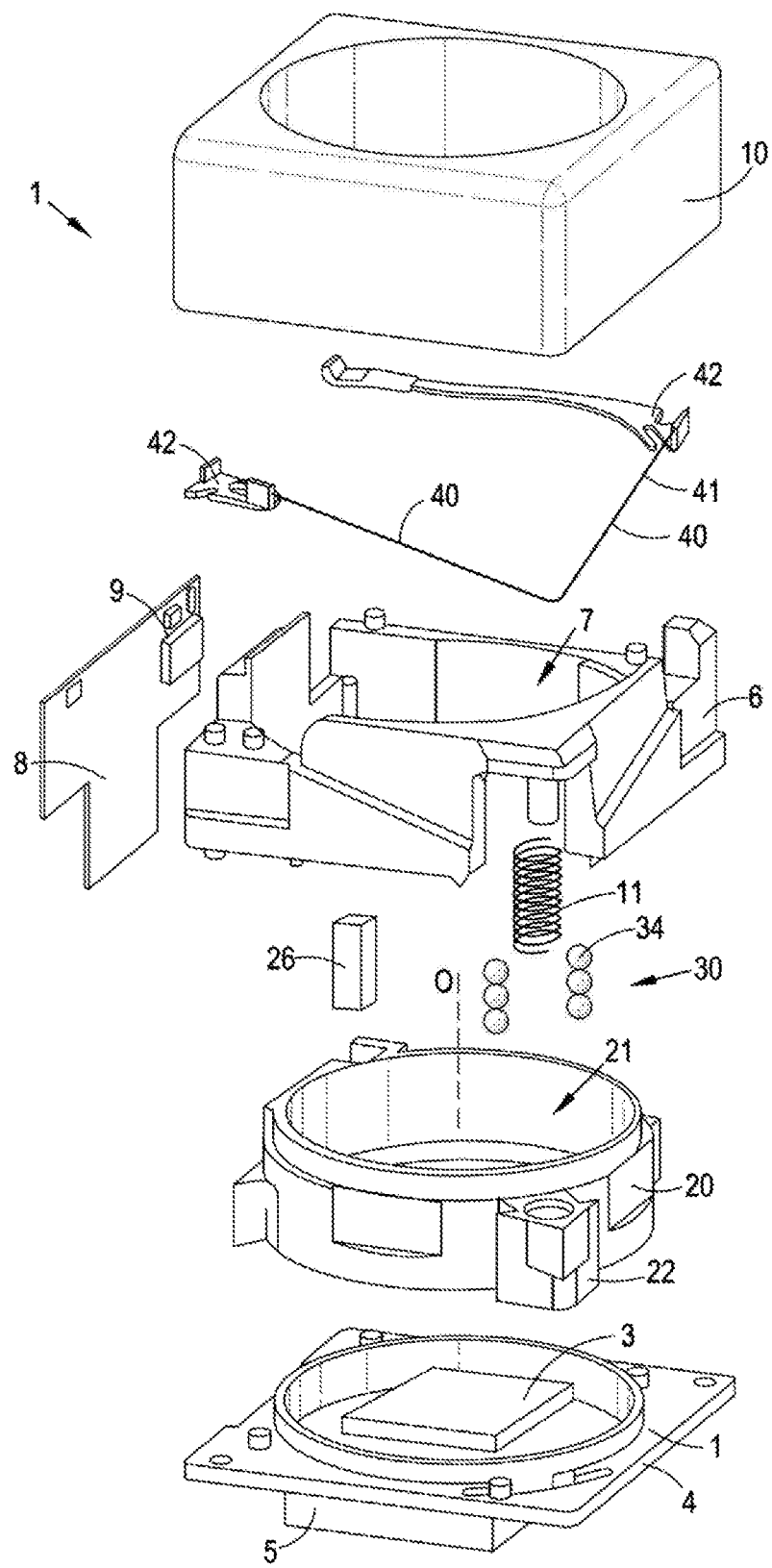
FIG. 2 is an exploded view of a first SMA actuation apparatus.

An SMA actuation apparatus 1 that is a camera is shown in FIGS. 1 and 2. The SMA actuation apparatus 1 comprises a support structure 2 that has an image sensor 3 mounted thereon.

The support structure 2 includes a base 4 which is a rigid plate. The image sensor 3 is fixed to the front side of the base 4. In the arrangement shown in FIG. 1 in which the SMA actuation apparatus 1 is controlled using a Hall sensor 9, the support structure 2 supports an IC chip 5 fixed to the rear side of the base 4. Alternatively, the SMA actuation apparatus 1 may be controlled using resistance control, in which case the IC chip 5 may be external to the SMA actuation apparatus 1. A control circuit is implemented in the IC chip 5 as described further below.

The support structure 2 also includes a chassis 6 that protrudes from the base 4 and may be a moulded component. The chassis 6 acts as a mounting platform for various elements as described below and also defines any reference features that are needed during the assembly process. The chassis 6 has a central aperture 7 aligned with the image sensor 3. In the arrangement shown in FIG. 1, the support structure 2 also includes a flexible printed circuit 8 fixed to the outside of the chassis 6. Typically, the flexible printed circuit 8 provides VDD, GND, SCL, and SDA connection pads (not shown). On the flexible printed circuit 8, a Hall sensor 9 is fixed near a magnet 26 supported by the support structure 6.

The SMA actuation apparatus 1 also includes a shield can 10 that fits to the base 4 and covers all the other components described below for protection against physical damage and ingress of dust.

The SMA actuation apparatus 1 further comprises a lens element 20 (see FIG. 2) that is the movable element in this example. The lens element 20 comprises a lens carriage 25 which holds a lens 21, although alternatively plural lenses may be present. (In FIG. 1, the lens itself is not present and numeral 21 indicates where the lens would be within the apparatus 1). The lens 21 may be made of glass or plastic. The lens element 20 has an optical axis O aligned with the image sensor 3 and is arranged to focus an image on the image sensor 3. The lens element 20 also has a protrusion 22 that is formed on one side protruding laterally of the optical axis O.

In the case where a Hall sensor 9 is present, the lens carriage 25 of the lens element 20 also mounts a magnet 26 located relative to the Hall sensor 9 on the support structure 2 so that the Hall sensor 9 senses the position of the lens element 20 along the optical axis O.

The SMA actuation apparatus 1 is a miniature optical device. In some examples of a miniature optical device, the lens 21 (or plural lenses, when provided) may have a diameter of at most 20 mm, preferably at most 15 mm, more preferably at most 10 mm. In embodiments, the lens diameter may be between 5 mm and 10 mm.

Although the SMA actuation apparatus 1 in this example is a camera, that is not in general essential. In some examples, the SMA actuation apparatus 1 may be an optical device in which the movable element is a lens element but there is no image sensor. In other examples, SMA actuation apparatus 1 may be a type of apparatus that is not an optical device, and in which the movable element is not a lens element and there is no image sensor.

The SMA actuation apparatus 1 also comprises a suspension system 30 that supports the lens element 20 on the support structure 2. The suspension system 30 is configured to guide movement of the lens element 20 with respect to the support structure 2 along the optical axis O which is therefore the movement direction in this example, while constraining movement of the lens element 20 with respect to the support structure 2 in other degrees of freedom. The suspension system 30 comprises a bearing arrangement that is described in more detail below.

The SMA actuation apparatus 1 also comprises two lengths of SMA actuator wire 40 that are arranged as follows to drive movement of the lens element 20 along the optical axis O. The two lengths of SMA actuator wire 40 are portions of a piece of SMA actuator wire 41 that is connected to the support structure 2 at each end by crimp portions 42 fixed at the top of the chassis 6 on opposite corners. The crimp portions 42 crimp the piece of SMA actuator wire 41 to provide both mechanical and electrical connection. The piece of SMA actuator wire 41 is also connected to the lens element 20 by being hooked around the protrusion 22. As a result, each of the lengths of SMA actuator wire 40 is connected at one end to the support structure 2 and at the other end to the lens element 20.

The lengths of SMA actuator wire 40 have an angled-V arrangement of the type disclosed in WO2007/113478, as follows.

The lengths of SMA actuator wire 40 have an angle therebetween of 90 degrees as viewed along the optical axis O which is the movement direction in this example. More generally, the orientation of the lengths of SMA actuator wire 40 could be changed so that the angle therebetween as viewed along the optical axis O has any size less than 180 degrees, preferably in the range from 70 to 110 degrees.

Figure 3:
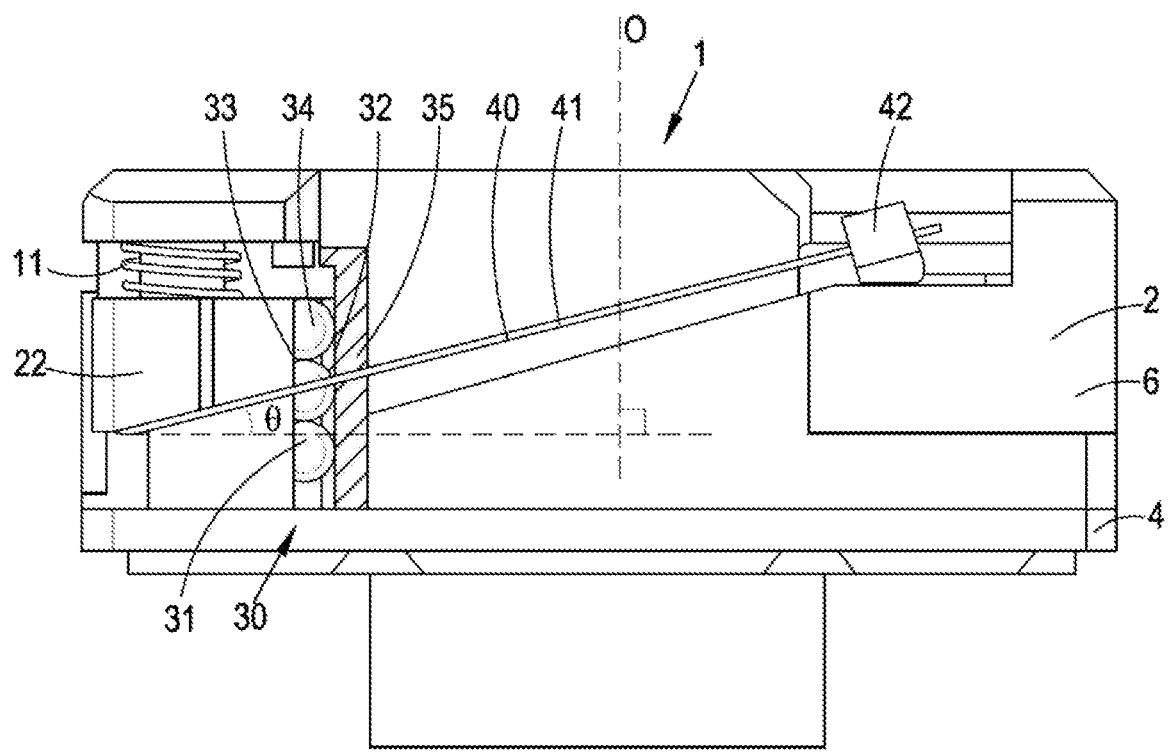
FIG. 3 is a side view of a first SMA actuation apparatus.

Also, each length of SMA actuator wire 40 is inclined in the same sense and at the same acute angle θ with respect to a plane normal to the optical axis O which is the movement direction in this example, as shown in FIG. 3. In this example, the angle θ is selected to be in the range from a lower limit of 5 degrees, or more preferably 8 degrees, to an upper limit of 15 degrees, or more preferably 12 degrees, with respect to a plane normal to the movement direction. In embodiments, the upper limit may be 22 degrees. Thus, the angle θ is relatively low, compared for example to WO2007/113478. This allows the overall height of the SMA actuation apparatus 1 along the optical axis O to be reduced, because the extent of the lengths of SMA actuator wire 40 projected along the optical axis O is reduced.

Such low values of the angle θ increase both the gain, which is the ratio of the amount of movement to the change in length of the lengths of SMA actuator wire 40, and the strain on the lengths of SMA actuator wire 40, which requires an increase in the power of the drive signals. These factors might be expected to make it more difficult to maintain the stability of the position of the lens element 20. However, surprisingly it has been found that in practise the stability of the lens element 20 can in fact be maintained at such a range of angles in the SMA actuation apparatus 1. This is due in part to forming the suspension system 30 as a bearing arrangement (described in greater detail below) as the bearings resist the increased lateral force. This is also assisted by the lens 21 being made from glass, because the extra mass compared to the use of plastic, means that the extra lateral force from the lengths of SMA actuator 40 is advantageous, allowing a viable device to be made. However, making the lens heavier reduces the resonant frequency, which may cause ambient vibrations to become a problem. Since a reduction in the wire angle also reduces the resonant frequency, there is a lower limit to the range of acceptable wire angles.

While selection of the angle θ in the range from 8 to 12 degrees is advantageous, it is not essential and the angle θ could be selected to have other values, for example a value over 12 degrees or over 15 degrees, or over 22 degrees.

The lengths of SMA actuator wire 40 drive movement of the lens element 20 along the optical axis O on application of drive signals that cause heating and cooling of the lengths of SMA actuator wire 40. The lengths of SMA actuator wire 40 are resistively heated by the drive signals and cool by thermal conduction to the surroundings when the power of the drive signals is reduced. The lengths of SMA actuator wire 40 contract on heating driving movement of the lens element 20 along the optical axis O in a first direction (upwards in FIGS. 1 and 2).

The SMA actuation apparatus 1 further comprises a compression spring 11 that is connected between the base 4 of the support structure 2 and the lens element 20 and acts a resilient biasing element for the lengths of SMA actuator wire 40. Thus, when the lengths of SMA actuator wire 40 cool, the compression spring 11 drives movement along the optical axis O in the opposite direction (downwards in FIGS. 1 and 2). As a result, the temperature of the lengths of SMA actuator wire 40 and hence the position of the lens element 20 along the optical axis O can be controlled by control of the power of the drive signals.

The control circuit implemented in the IC chip 5 generates the drive signals and supplies them to the lengths of SMA actuator wire 40 to which it is connected. The control circuit receives an input signal representing a desired position for the lens element 20 along the optical axis O and generates drive signals having powers selected to drive the lens element 20 to the desired position. The power of the drive signals may be either linear or varied using pulse width modulation.

The drive signals may be generated using closed-loop control based on the output of the Hall sensor 9 which senses the position of the lens element 20 along the optical axis O.

Alternatively, the drive signals may be generated using a resistance feedback control technique which may for example be implemented as disclosed in any of WO2013/175197; WO2014/076463; WO2012/066285; WO2012/020212; WO2011/104518; WO2012/038703; WO2010/089529 or WO2010029316, each of which is incorporated herein by reference in its entirety.

The suspension system 30 will now be described with reference to FIGS. 4 to 6 which show three different bearing arrangements of rolling bearings 31.

The suspension system 30 comprises a bearing arrangement of plural rolling bearings 31. Each of the rolling bearings 31 comprises a bearing surface 32 on the support structure 2, in particular on the chassis 6, and a bearing surface 33 on the lens element 20, in particular on the lens carriage 25. Each of the rolling bearings 31 also comprises one or more balls 34 disposed between the bearing surfaces. The balls 34 therefore act as rolling bearing elements, although as an alternative other types of rolling bearing element could be used, for example a roller.

The bearing surface 32 on the support structure 2 desirably has a low surface roughness in order to minimise friction and dynamic tilt. In some cases, it may be adequate for the bearing surface 32 to be a plastic moulded surface. More preferably, the bearing surface 32 is made of metal. As the chassis 6 is a moulded element, this is achieved by the bearing surface 32 being a surface of a metal insert 35 disposed in the chassis 6. Similarly, the bearing surface 33 on the lens element 20 could alternatively or additionally be a metal surface formed as the surface of a metal insert disposed in the lens carriage which is also a moulded element.

Forming the bearing surface 32 (and/or the bearing surface 33) of metal gives a smooth surface on which the balls 34 can run and allows the desired dynamic tilt performance to be achieved. Imperfections in the bearing surfaces 32 and 33 may give rise to dynamic tilt. Such imperfections can take the form of surface curvature and surface roughness. The impact of imperfections of the bearing surfaces 32 and 33 on the dynamic tilt is increased if the number of balls 34 is reduced, or in the case of plural balls 34 if the distance between the contact points of the upper and lower balls 34 is reduced.

The three different bearing arrangements of bearings 31 are arranged as follows.

The first bearing arrangement shown in FIG. 4 comprises four bearings 31a-31d arranged as follows.

In each of the bearings 31a-31d, the bearing surface 32 on the support structure 2 is a planar surface and the bearing surface 33 on the lens element 20 is a groove (although alternatively the bearing surface 32 on the support structure 2 could be a groove and the bearing surface 33 on the lens element 20 could be a planar surface). Here, and elsewhere where a bearing surface is a groove, the following applies. The groove of the bearing surface 33 creates contact with the ball 34 along a pair of parallel lines as the ball 34 rolls. The planar surface on the bearing surface 33 is substantially parallel to the pair of parallel lines of the contact in the groove of the bearing surface 33.

Due to the inclusion of a planar surface on the bearing surface 32, each of the bearings 31a-31d constrains movement of the bearing surfaces 32 and 33 towards each other, but does not constrain lateral movement of the bearing surfaces 32 and 33.

Two bearings 31a, 31b are located against the protrusion 22 on opposite sides of the protrusion 22 as viewed along the optical axis O. These bearings 31a, 31b comprise plural balls 34, typically three balls 34, as shown in FIGS. 1 and 2. Where three or more balls 34 are provided, the inner balls 34 may be smaller in diameter compared with the outer two balls 33, and used as spacers.

Figure 4:
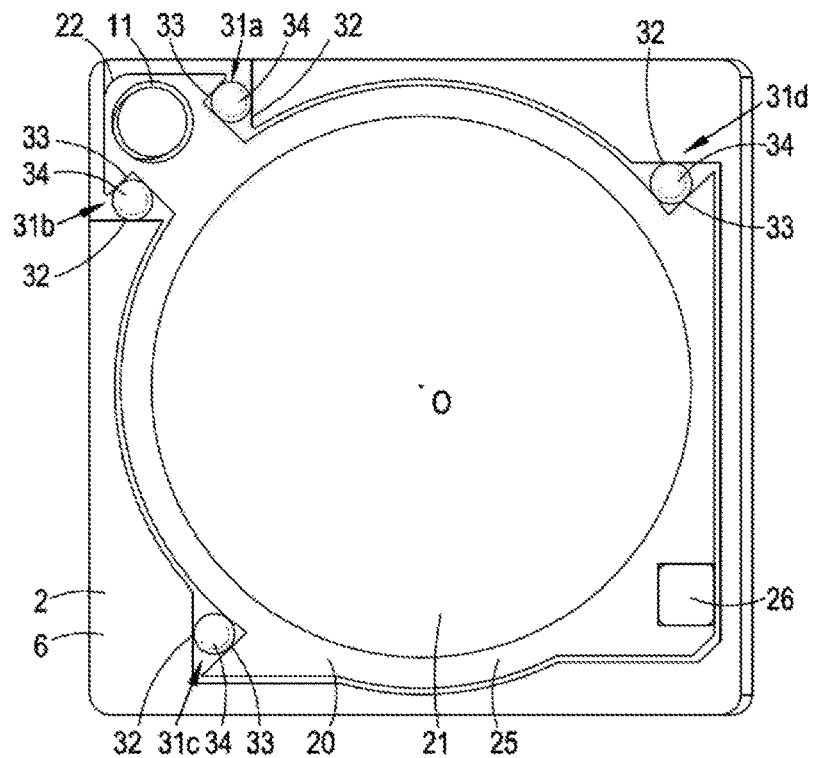
FIGS. 4 to 6 are plan views of different bearing arrangements for the first SMA actuation apparatus.

Due to their location against the protrusion 22, these bearings 31a, 31b are close to the location where the lengths of SMA actuator wires 40 apply force to the lens element 20, which assists in constraining against rotation about an axis normal to a plane containing the optical axis O (i.e. an axis into the paper in FIG. 3 and sideways in FIG. 4). This is because, as viewed perpendicular to the optical axis O, the couple between the forces applied by the lengths of SMA actuator wires 40 and by the bearings 31a, 31b is reduced, compared to the bearings 31a, 31b being located further away. This effect is improved by the provision of plural balls 34 in the bearings 31a, 31b which increases the length of the bearings 31a, 31b along the optical axis O. Thus, the dynamic tilt performance is dependent on the spacing of the two outer balls 34 in the bearings 31a, 31b, as well as the flatness of the bearing surfaces 32 and 33.

The other bearings 31c, 31d are positioned close to the location where the lengths of the SMA actuator wires 40 are connected to the chassis 6. Thus, the bearings 31c, 31d provide a constraint against rotation in a plane normal to the optical axis O around an axis close to the compression spring 11. As the primary function of the other bearings 31c, 31d is to prevent such rotation, the other bearings 31c, 31d may each include a single ball 33. Rotation of the lens element 20 around this axis is not expected during normal operation but is important for control of unpowered drop events.

Two other bearings 31c, 31d are needed because in general the rotation permitted by the bearings 31a, 31b located against the protrusion in the plane normal to the optical axis O may occur in either sense. However, the other bearings 31c, 31d must be arranged so that only one of the two balls 33 is in contact with both the support structure 2 and the lens element 20 in order not to over constrain the system.

Thus, in the first bearing arrangement, four bearings 31a-31d are used to prevent rotation, but the design requires several components with tight tolerances so that it is able to be assembled without being over constrained. The second and third bearing arrangements provide simplified designs that provide relaxed tolerances and ease of assembly because of reduced component count.

Figure 5:
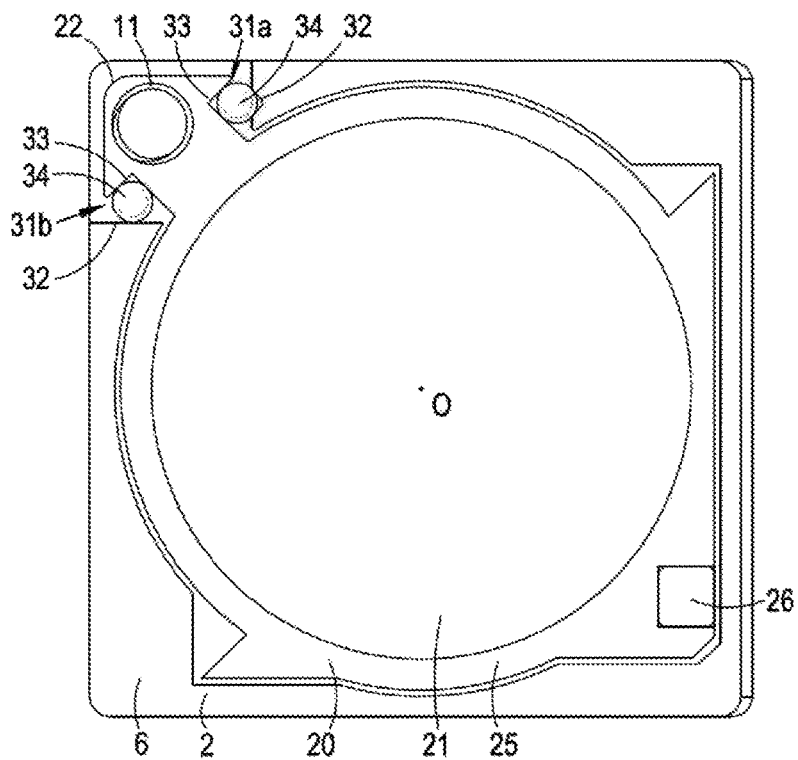

The second bearing arrangement shown in FIG. 5 comprises only two bearings 31a, 31b. As for the corresponding bearings 31a, 31b in the first bearing arrangement, these bearings 31a, 31b are located against the protrusion 22 on opposite sides of the protrusion 22 as viewed along the optical axis O, and comprise plural balls 34, typically three balls 34. Where three or more balls 34 are provided, the inner balls 34 may be smaller in diameter compared with the outer two balls 33, and used as spacers. As such, these bearings 31a, 31b assist in constraining against rotation about an axis normal to a plane containing the optical axis O, and the above comments about this effect from the corresponding bearings 31a, 31b in the first bearing arrangement apply equally to the second bearing arrangement.

However, the bearing surfaces 32 and 33 of the bearings 31a, 31b are changed compared to the first bearing arrangement for constraining against rotation in a plane normal to the optical axis O. In particular, in one of the bearings 31a, the bearing surface 32 on the support structure 2 and the bearing surface 33 on the lens element 20 are each grooves. Each of the grooves of the bearing surface 32 and the groove of the bearing surface 33 create contact with the ball 34 along a pair of parallel lines as the ball 34 rolls, the two pairs of parallel lines being parallel to each other.

In the other bearing 31b, it remains the case that the bearing surface 32 on the support structure 2 is a planar surface and the bearing surface 33 on the lens element 20 is a groove (although alternatively the bearing surface 32 on the support structure 2 could be a groove and the bearing surface 33 on the lens element 20 could be a planar surface).

This non-symmetrical arrangement of the bearings 31a, 31b constrains the motion of the lens element 20 against rotation in a plane normal to the optical axis O. Conceptually, this constraint may be understood by thinking of the grooves on the bearing surfaces 32 and 33 of the bearing 31a constraining motion in all degrees of freedom except for rotation around an axis through the bearing 31a itself, which rotation itself is constrained by the other bearing 31b. As the other bearing 31b includes a bearing surface 33 that is planar, that constraint is applied without over-constraining the overall bearing arrangement.

Figure 6:
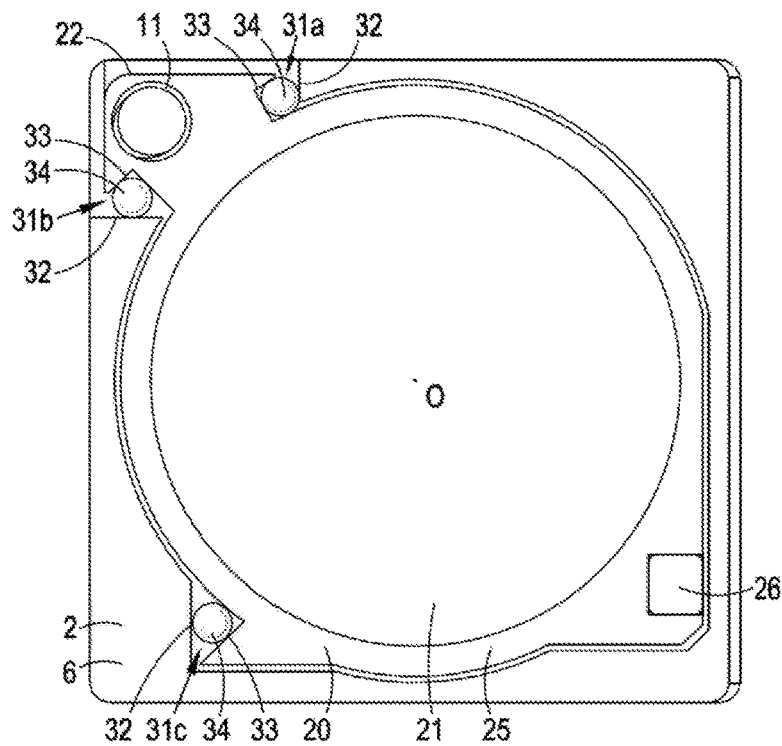

The third bearing arrangement shown in FIG. 6 comprises only three bearings 31a-31c. As in the first bearing arrangement, two of these bearings 31a, 31b are located against the protrusion 22 on opposite sides of the protrusion 22 as viewed along the optical axis O, and comprise plural balls 34, typically three balls 34. Where three or more balls 34 are provided, the inner balls 34 may be smaller in diameter compared with the outer two balls 33, and used as spacers. As such, these bearings 31a, 31b assist in constraining against rotation about an axis normal to a plane containing the optical axis O, and the above comments about this effect from the corresponding bearings 31a, 31b in the first bearing arrangement apply equally to the third bearing arrangement.

However, in contrast to the first bearing arrangement, the two bearings 31a, 31b are non-symmetrically arranged so that they apply a couple to the lens element 2 in a plane normal to the optical axis O. In contrast to the first bearing arrangement where a rotation in the plane normal to the optical axis O may be in either sense, this couple created by the two bearings 31a, 31b in the third bearing arrangement tends to create a rotation in a particular sense. Thus, merely a single further bearing 31c may be provided to constrain against that rotation, located against the lens element 22 in a location where it prevents that rotation. As the primary function of the other bearing 31c is to prevent such rotation, the other bearing 31c may include a single ball 33.

In the other bearing 31c, the bearing surface 32 on the support structure 2 is a planar surface and the bearing surface 33 on the lens element 20 is a groove (although alternatively the bearing surface 32 on the support structure 2 could be a groove and the bearing surface 33 on the lens element 20 could be a planar surface). As such, the constraint against rotation may be applied without over-constraining the overall bearing arrangement.

Although rolling bearings 31 are described above, as an alternative the rolling bearings 31 may be replaced by plain bearings.

Figure 7:
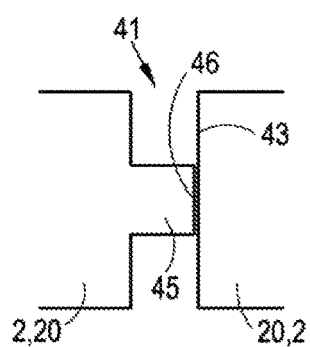
FIG. 7 is a cross-sectional view of an alternative bearings for the first SMA actuation apparatus, the cross-section being taken perpendicular to the direction of movement of the bearing.
Figure 8:
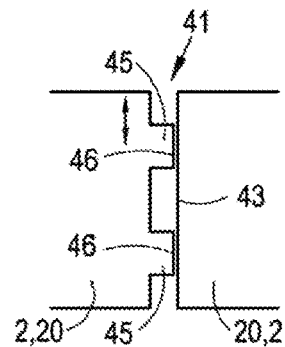
FIG. 8 is a side view of the alternative bearing of FIG. 7.

In one example, a plain bearing 41 of the first type illustrated in FIGS. 7 and 8 may be used. The plain bearing 41 comprises an elongate bearing surface 43 on one of the support structure 2 and the lens element 20. The plain bearing 41 also comprises protrusions 45 formed on the other of the support structure 2 and lens element 20, the ends of the protrusions 45 forming bearing surfaces 46 which bear on the elongate bearing surface 43. Although two protrusions 45 are shown in the example of FIG. 8, in general any number of one or more protrusions 45 may be provided. The elongate bearing surface 43 and the bearing surfaces 46 are conformal, both being planar in this example, so as to permit relative movement of the lens element 20 with respect to the support structure 2. The elongate bearing surface 43 and the bearing surfaces 46 desirably have a coefficient of friction of 0.2 or less.

Figure 9:
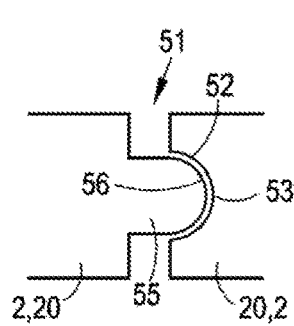
FIG. 9 is a cross-sectional view of an alternative bearings for the first SMA actuation apparatus, the cross-section being taken perpendicular to the direction of movement of the bearing.
Figure 10:
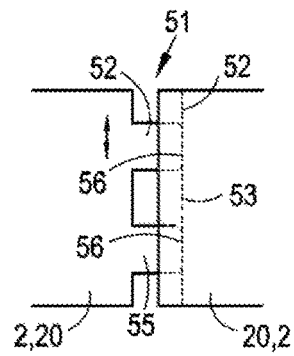
FIG. 10 is a side view of the alternative bearing of FIG. 9.

In another example, a plain bearing 51 of the second type illustrated in FIGS. 9 and 10 may be used. The plain bearing 51 comprises a channel 52 on one of the support structure 2 and the lens element 20, the inner surface of the channel 52 forming a bearing surface 53. The plain bearing 51 comprises protrusions 55 formed on the other of the support structure 2 and lens element 20, the ends of the protrusions 55 forming bearing surfaces 56 which bear on the bearing surface 53. Although two protrusions 55 are shown in this example, in general any number of one or more protrusions 55 may be provided. The elongate bearing surface 53 and the bearing surfaces 56 are conformal, both being planar in this example, so as to permit relative movement of the lens element 20 with respect to the support structure 2. The elongate bearing surface 53 and the bearing surfaces 56 desirably have a coefficient of friction of 0.2 or less.

In each of the plain bearings 41 and 51, the materials of the bearing surfaces 43, 46, 53, 56 are chosen to provide smooth movement and a long life. The bearing surfaces 43, 46, 53, 56 may be unitary with the underlying component or may be formed by a surface coating. Suitable materials include, for example PTFE or other polymeric bearing materials, or metal.

It may be surprising that a plain bearing is able to function adequately for an application of guiding movement of the lens element 20 along the optical axis O, given that the lens element 20 needs to move smoothly without sticking and slipping throughout its life. However, it has been found that plain bearings perform adequately by control of the forces experienced by the bearing, both in plane and perpendicular to the movement direction, to be within an appropriate range. Thus, compared to the rolling bearings 31, plain bearings can provide a similar function of constraining motion in degrees of freedom other than along the optical axis O while reducing some or all of the issues described above, as follows.

Manufacture of the SMA actuator apparatus is simplified as the component count is reduced and assembly of the bearings is easier to perform because there are no rolling bearings to manipulate. Similarly, the risk of rolling bearing elements falling out of the bearings in use due to insufficient mechanical constraint is eliminated.

Also, the use of plain bearings may allow the height of the SMA actuation apparatus along the optical axis to be reduced, which is desirable for miniaturisation of cameras and other optical devices. In particular, the overall height of the bearing surfaces may be reduced while providing a desired degree of dynamic tilt, compared to bearings comprising rolling bearing element.

More generally, the rolling bearings 31 may also be replaced by any of the following types of bearing: jewel bearing; fluid bearing; magnetic bearing; flexure bearing; or composite bearing. Further, the rolling bearings 31 may also be replaced by a rocker or pivot bearing, where the bearing element pivots or rocks on the moving and static elements.

The second to fourth SMA actuation apparatuses will now be described. Each of the second to fourth SMA actuation apparatuses is a modified version of the first SMA actuation apparatus 1. Accordingly, only the modifications will be described, the second to fourth SMA actuation apparatuses otherwise having the construction of the first SMA actuation apparatus 1 as described above.

Figure 11:
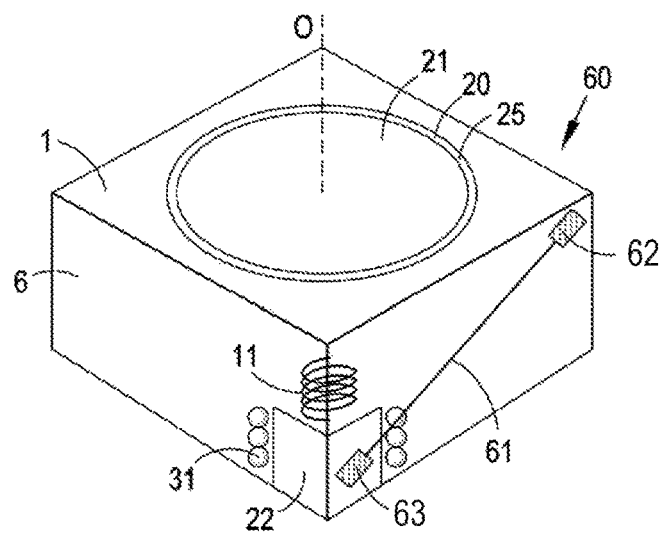
FIG. 11 is a perspective view of a second SMA actuation apparatus.

A second SMA actuation apparatus 60 is shown in FIG. 11. In the second SMA actuation apparatus 60, the two lengths of SMA actuator wire 40 in the first SMA actuation apparatus 1 are replaced by a single straight SMA actuator wire 61 that is connected to the support structure 2 by a crimp portion 62 fixed to the protrusion and is connected to the lens element 20 by a crimp portion 63 fixed to the lens carriage 25. The crimp portions 62 and 63 crimp the SMA actuator wire 61 to provide both mechanical and electrical connection.

As mentioned above, the second SMA actuation apparatus 60 otherwise has the construction of the first SMA actuation apparatus, and so the SMA actuator wire 61 has the same configuration as one of the lengths of SMA actuator wire 40 in the first SMA actuation apparatus 1, that is inclined at an acute angle θ greater than 0 degrees with respect to a plane normal to the optical axis O, preferably in the range from a lower limit of 5 degrees, or more preferably 8 degrees, to an upper limit of 15 degrees, or more preferably 12 degrees, with respect to a plane normal to the movement direction. Thus, the angle θ is relatively low, compared for example to WO2007/113478. This allows the overall height of the SMA actuation apparatus 1 along the optical axis O to be reduced, because the extent of the lengths of SMA actuator wire 40 projected along the optical axis O is reduced. This provides the same advantages as the use of such an angle in the first SMA actuation apparatus 1, and the comments about this aspect of the first SMA actuation apparatus 1 apply equally to the second SMA actuation apparatus 60.

Such low values of the angle θ increase both the gain, which is the ratio of the amount of movement to the change in length of the SMA actuator wire 61, and the strain on the SMA actuator wire 61, which requires an increase in the power of the drive signals. These factors might be expected to make it more difficult to maintain the stability of the position of the lens element 20. However, surprisingly it has been found that in practise the stability of the lens element 20 can in fact be maintained at such a range of angles in the SMA actuation apparatus 1. This is due in part to forming the suspension system 30 as a bearing arrangement (described in greater elsewhere in this document) as the bearings resist the increased lateral force. This is also assisted by the lens 21 being made from glass, because the extra mass compared to the use of plastic, means that the extra lateral force from the SMA actuator wire 61 is advantageous, allowing a viable device to be made. However, making the lens heavier reduces the resonant frequency, which may cause ambient vibrations to become a problem. Since a reduction in the wire angle also reduces the resonant frequency, there is a lower limit to the range of acceptable wire angles.

While selection of the angle θ in the range from 8 to 12 degrees is advantageous, it is not essential and the angle θ could be selected to have other values, for example a value over 12 degrees or over 15 degrees.

The manufacture of the second SMA actuation apparatus 60 is simplified compared to both the first SMA actuation apparatus 1 and to the angled-V arrangement of WO2007/113478, as there is only a single length of SMA actuator wire 61 and no requirement to hook that SMA actuator wire 61 over the protrusion 22. The inclination of the SMA actuator wire 61 retains the advantage of providing gain in the amount of movement and is useful for minimising the height of the second SMA actuation apparatus 60 along the optical axis O.

The SMA actuator wire 61 produces considerable lateral forces, when compared to known arrangements using 2, 4 or 8 SMA actuator wires which generally provide some balancing of lateral forces generated by different SMA actuator wires. However, it has been appreciated by analysis and experiment that surprisingly it is possible to adequately counteract these lateral forces by the suspension system 30 due to the use of the bearing arrangement of bearings 31.

Figure 12:
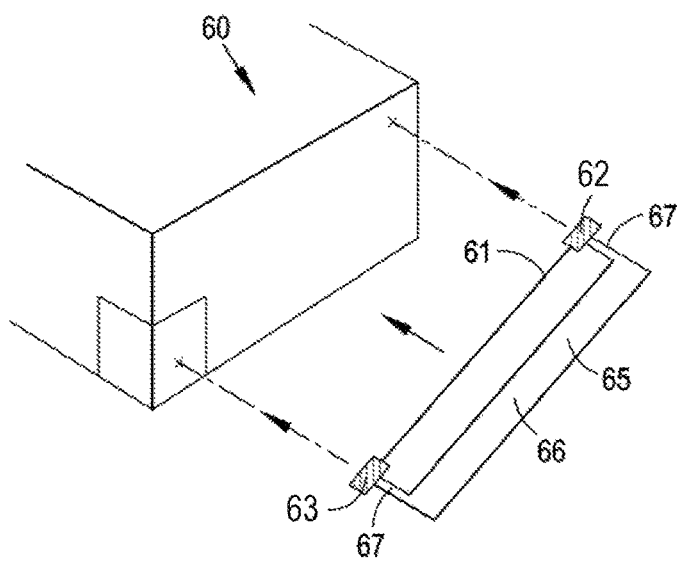
FIG. 12 is a perspective view of a step during manufacture of the second SMA actuation apparatus.

Assembly of the second SMA actuation apparatus 60 may be performed using the method disclosed in WO2016/189314, for example as illustrated in FIG. 12. This method uses a strut element 65 shaped to comprise a sacrificial strut body 66 and crimp tabs 67 held apart by the sacrificial strut body 66.

The SMA actuator wire 61 is laid at a known tension, for example from a reel, across the crimp tabs 67 which are folded and pressed over the SMA actuator wire 61 by a closing tool (not shown) to form crimp portions 62 and 63 holding the SMA actuator wire 61. Then the crimp portions 62 and 63 are attached to the support structure 2 and the lens element 20, respectively, for example by mechanical or adhesive means.

After that, the sacrificial strut body 66 is removed, leaving the crimp portions 62 and 63 attached to the support structure 2 and the lens element 20, respectively.

In the second SMA actuation apparatus 60, electrical connections need to be made to both ends of the SMA actuator wire 61. Such connection is straightforward at the support structure 2 as this is where the flexible circuit board 8 is located. The connection at the lens element 20 may be made in any suitable manner, for example by a flexible connector or by some other component of the SMA actuation apparatus 60 such as the compression spring 11 or a flexure if used as the suspension system 30.

Figure 13:
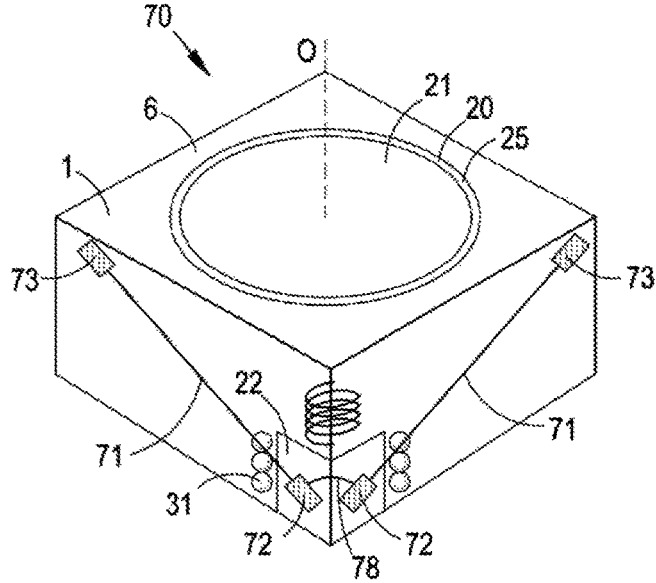
FIG. 13 is a perspective view of a third SMA actuation apparatus.

Compared to the first SMA actuation apparatus 1, the second actuation apparatus 60 generates half the amount of force in the direction along the optical axis O. A third SMA actuation apparatus 70 which generates the same force as the first SMA actuation apparatus 1 is shown in FIG. 13.

In the third SMA actuation apparatus 70, the single piece of SMA actuator wire 41 hooked over the protrusion in the first SMA actuation apparatus 1 is replaced by two lengths of SMA actuator wire 71 that are each connected to the support structure 2 by a crimp portion 72 fixed to the protrusion 22 and are each connected to the lens element 20 by a crimp portion 73 fixed to the lens carriage 25. The crimp portions 72 and 73 crimp the SMA actuator wire 71 to provide both mechanical and electrical connection.

As mentioned above, the third SMA actuation apparatus 70 otherwise has the construction of the first SMA actuation apparatus 1, including the following features. Apart from the manner of connection at the protrusion 22, the two lengths of SMA actuator wire 71 have the same configuration as the lengths of SMA actuator wire 40 in the first SMA actuation apparatus 1. Thus, SMA actuator wires 71 have an angled-V arrangement of the type disclosed in WO2007/113478, as follows.

The two lengths of SMA actuator wire 71 have an angle therebetween of 90 degrees as viewed along the optical axis O which is the movement direction in this example. More generally, the orientation of the lengths of SMA actuator wire 71 could be changed so that the angle therebetween as viewed along the optical axis O has any size less than 180 degrees, preferably in the range from 70 to 110 degrees.

Also, each length of SMA actuator wire 71 is inclined in the same sense and at the same acute angle θ with respect to a plane normal to the optical axis O which is the movement direction in this example. The lengths of SMA actuator wire 71 are also positioned at the same elevation along the optical axis O. In this example, the angle θ is selected to be in the range from 5 to 15 degrees, more preferably 8 to 12 degrees, with respect to a plane normal to the movement direction. This provides the same advantages as the use of such an angle in the first SMA actuation apparatus 1, and the comments about this aspect of the first SMA actuation apparatus 1 apply equally to the third SMA actuation apparatus 70.

However, while selection of the angle θ in the range from 8 to 12 degrees is advantageous, it is not essential and the angle θ could be selected to have other values, for example a value over 12 degrees or over 15 degrees.

The manufacture of the second SMA actuation apparatus 70 is simplified compared to both the first SMA actuation apparatus 1 and to the angled-V arrangement of WO2007/113478, as there is no requirement to hook the lengths of SMA actuator wire 71 over the protrusion 22 and the crimp portions 73 may each be attached to the protrusion 22. The inclination of the lengths of SMA actuator wire 71 retain the advantage of providing gain in the amount of movement and is useful for minimising the height of the third SMA actuation apparatus 70 along the optical axis O.

In the third SMA actuation apparatus 70, in order to provide electrical connections to both the lengths of SMA actuator wire 71, an electrical connector 78 is provided on the lens element 20 making an electrical connection between the lengths of SMA actuator wire 71. In one type of embodiment the two lengths of SMA actuator wire 71 and the electrical connector 78 may each be part of a single piece of SMA actuator wire. In another type of embodiment, the two lengths of SMA actuator wire 71 may be separate pieces of SMA actuator wire and the electrical connector 78 may be a separate component, for example a conductive track or metal element moulded into the lens carriage 24 that connects the two crimp portions 73, or alternatively a body that is integral with the crimp portions 73. As a result an electrical connection may be made to the two lengths of SMA actuator wire 71 at the support structure through the crimp portions 72 which is straightforward as this is where the flexible circuit board 8 is located. This allows supply of a drive signal through both lengths of SMA actuator wire 71 in series without requiring any electrical connection to be made at the lens element 20.

Assembly of the third SMA actuation apparatus 70 may be performed using the method disclosed in WO2016/189314, for example as illustrated in FIG. 12.

The method may use a separate strut element 75 for each length of SMA actuator wire 71 which are then assembled by twice performing the method of assembly of the single wire 61 in the second SMA actuation assembly 60 as described above.

Figure 14:
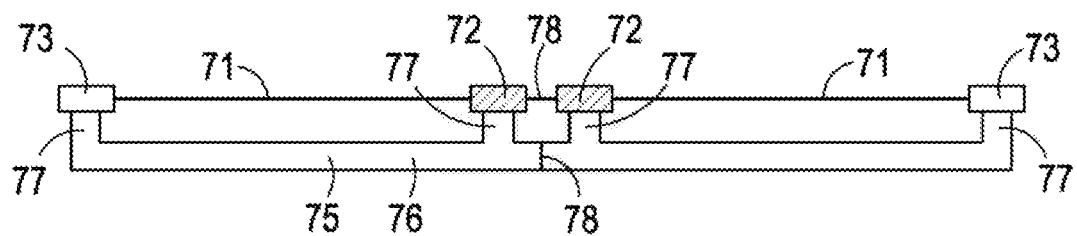
FIG. 14 is a side view of a strut element used during manufacture of the third SMA actuation apparatus.

Alternatively, as shown in FIG. 14, the method may use a single strut element 75 shaped to comprise a sacrificial strut body 76 and crimp tabs 77 for both of the lengths of SMA actuator wire 71 held apart by the sacrificial strut body 76. The strut element 75 has a bend of 90 degrees at bend line 78 so that the two lengths of SMA actuator wire 71 can be attached in their respective orientations.

The lengths of SMA actuator wire 71 are laid at a known tension, for example from a reel, across the crimp tabs 77 which are folded and pressed over the lengths of SMA actuator wire 71 by a closing tool (not shown) to form crimp portions 72 and 73 holding the lengths of SMA actuator wire 71. The two lengths of SMA actuator wire 71 and the electrical connector 78 may be a part of a single piece of SMA actuator wire, or alternatively, the two lengths of SMA actuator wire 71 may be separate pieces of SMA actuator wire 71 and the electrical connector 78 may be part of the strut element 75.

Then the crimp portions 72 and 73 are attached to the support structure 2 and the lens element 20, respectively, for example by mechanical or adhesive means.

After that, the sacrificial strut body 76 is removed, leaving the crimp portions 72 and 73 attached to the support structure 2 and the lens element 20, respectively.

The third SMA actuation apparatus 70 may be modified to change the configuration or number of the lengths of SMA actuator wire 71, including by way of non-limitative example arrangements with: parallel inclined lengths of SMA actuator wire 71 on the same side of the SMA actuation apparatus 70; crossed lengths of SMA actuator wire 71 on one side of the SMA actuation apparatus 70 providing opposed movement; or two pairs of parallel lengths of SMA actuator wire 71 on adjacent sides of the SMA actuation apparatus 70.

Figure 17:
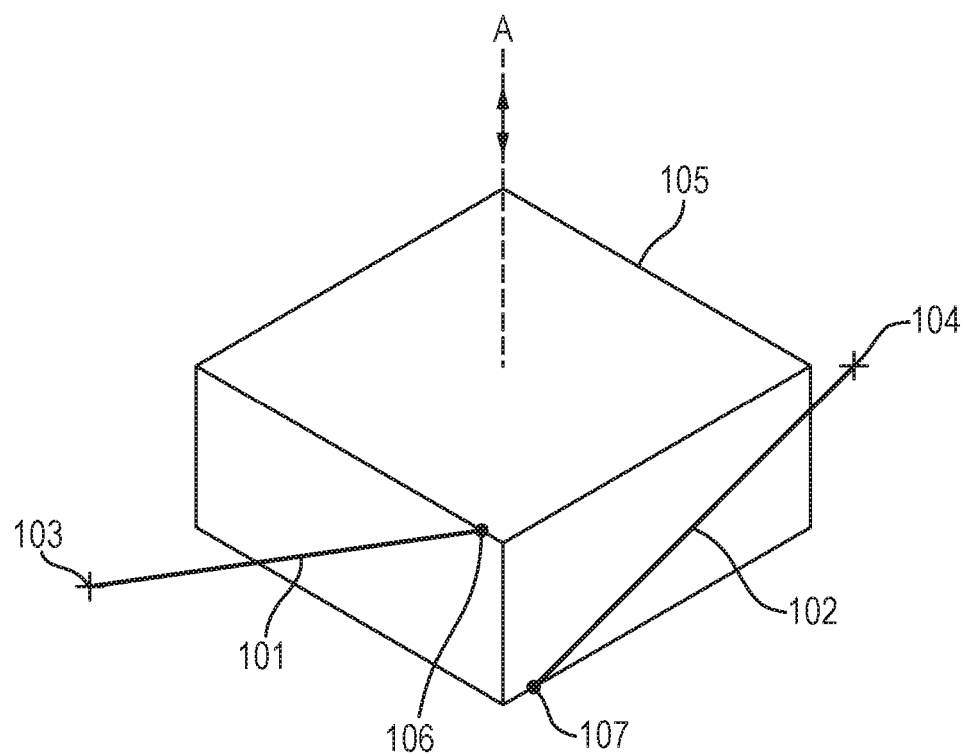
FIG. 17 shows a perspective view of an alternative form of the third SMA actuation apparatus.

FIG. 17 shows a perspective view of an alternative form/arrangement of the third SMA actuation apparatus. In this alternative arrangement, two SMA wires 101 and 102 are connected to the static element (not shown) via crimps 103, 104 respectively, and to the movable element 105 via crimps 106 and 107 respectively. The SMA wires 101, 102 contract when activated and move the movable element 105 in opposite directions along the movement direction, shown as dashed line A. SMA wire 101 may cause movement downwards (e.g. in a direction towards the bottom of the page on which FIG. 17 is shown), while SMA wire 102 may cause movement in the opposite direction (e.g. in a direction towards the top of the page on which FIG. 17 is shown).

In FIG. 17, the two inclined straight lengths of SMA wire 101, 102 are not arranged in the angled-V arrangement described above with respect to FIG. 13. Instead, the two inclined lengths of wire 101, 102 may be inclined in opposite senses, such that the wires cause movement in opposite directions. Accordingly, one of the two shape memory alloy actuator wires is inclined such that it drives movement of the movable element 105 relative to the support structure in a first direction, and the other of the two SMA actuator wires drives movement of the movable element 105 relative to the support structure in a second direction, where the second direction is opposite to the first direction. This may have the advantage that activation of both wires 101, 102 may hold the movable element at a desired position and activation (e.g. powering) of one wire more than the other may cause movement along movement axis A. The wires 101, 102 may cause movement in either direction, removing the need for a return spring and providing more accurate control.

The two shape memory alloy actuator wires 101, 102 are shown in FIG. 17 as being inclined with respect to a plane normal to the movement direction in the opposite sense. The wires 101, 102 are arranged on adjacent sides of the movable element 105. Alternatively, it will be understood that the two shape memory alloy actuator wires may be located on opposite sides of the movable element.

Figure 15:
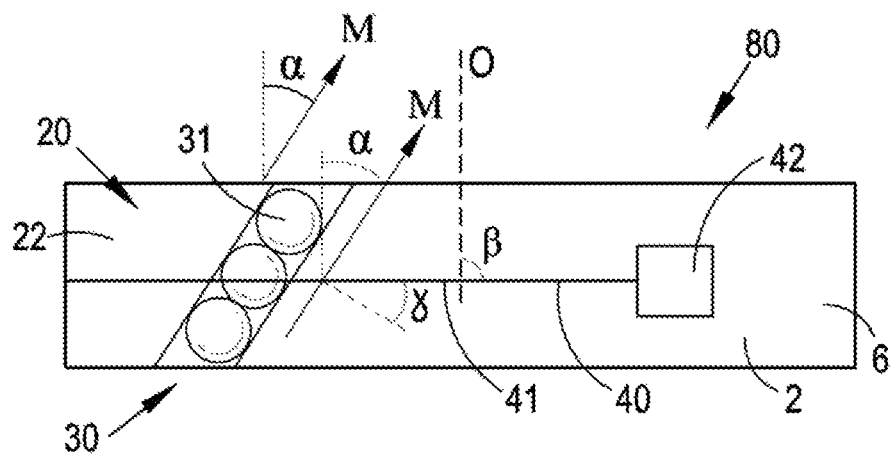
FIGS. 15 and 16 are schematic side views of two alternative forms of a fourth SMA actuation apparatus.
Figure 16:
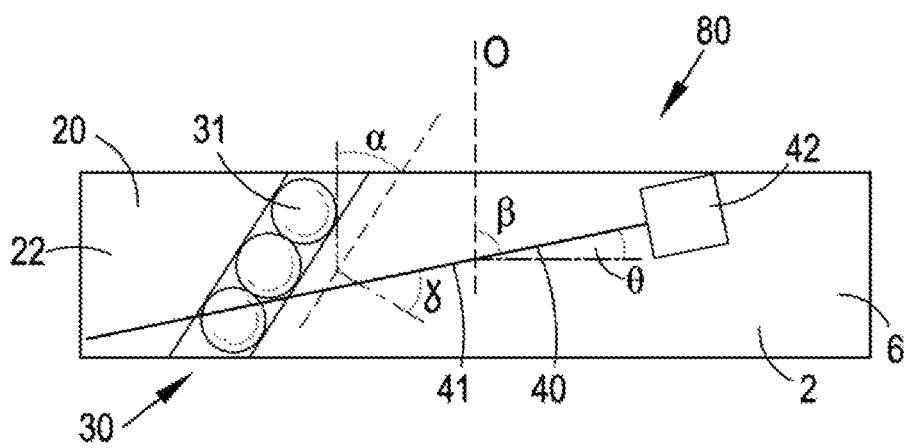

Two alternative forms of a fourth SMA actuation apparatus 80 are shown in FIGS. 15 and 16.

In the fourth SMA actuation apparatus 80, the bearing arrangement which forms the suspension system 30 is modified so that the bearings 31 guide movement of the lens element 20 along a movement direction M with respect to the support structure 2 that is inclined at a first acute angle α greater than 0 degrees with respect to the optical axis O of the lens element 20. Thus, the lens element 20 is allowed to have a component of lateral motion perpendicular to the optical axis O. However, such lateral motion may be acceptable in many applications. Furthermore, this has the advantage of reducing the force that is transmitted though the suspension system 30 and also reducing the gain.

The lengths of SMA actuator wire 40 are inclined at a second acute angle β, greater than the first acute angle α, with respect to the optical axis O. This means that lengths of SMA actuator wire 40 are still inclined with respect to the movement direction M, but the angle θ of the lengths of SMA actuator wire 40 with respect to the normal to the optical axis O is reduced. That allows the overall height of the fourth SMA actuation apparatus 80 to be reduced, while maintaining the degree of stroke and maintaining good control. In the fourth SMA actuation apparatus 80, the key angle that determines the performance of the lengths of SMA actuator wire 40 is no longer the angle θ between the lengths of SMA actuator wire 40 and the plane normal to the optical axis O, but the angle γ between the lengths of SMA actuator wire 40 and the plane normal to the movement direction M of lens element 20 with respect to the support structure 20. Thus, the size of the fourth SMA actuation apparatus 80 along the optical axis O is no longer limited by the lengths of SMA actuator wire 40.

In the first form of the fourth SMA actuation apparatus 80 shown in FIG. 15, the lengths of SMA actuator wire 40 extend in a plane normal to the optical axis O. In that case, lengths of SMA actuator wire 40 have a minimum extent projected along the optical axis O.

In the second form of the fourth SMA actuation apparatus 80 shown in FIG. 16, the lengths of SMA actuator wire 40 extend at an angle θ greater than 0 degrees with respect to a plane normal to the optical axis O. In that case, the lengths of SMA actuator wire 40 have an extent projected along the optical axis O, but this may be controlled by adjusting the angle θ to fit within the size constraint of some other component of the SMA actuation apparatus. For example, the extent of the lengths of SMA actuator wire 40 projected in the direction of the optical axis O may be arranged to be the same or less than the extent of the bearing arrangement of bearings 31 projected in the direction of the optical axis O.

It will be understood that in each of the above described embodiments, the SMA actuator wire may be connected in place using welding instead of crimping. The SMA wire may be welded to the crimps/crimp portions. Alternatively, the crimps/crimp portions may be replaced by suitable connection components (e.g. tabs) to which the SMA wire may be welded. Thus, wherever crimping is mentioned herein, it will be understood that the crimping may be replaced by welding. Techniques for welding the SMA actuator wire are described in International Patent Application No. PCT/GB2019/050072, which is incorporated herein by reference in its entirety.

It will be understood that some or all of the features described herein may be combined with each other. For example, some or all of the features shown in FIG. 4 may be combined with some or all of the features shown in FIG. 11.

This may enable a symmetrical version of the non-symmetrical bearing arrangement shown in FIG. 6 to be provided.

It will also be understood that although embodiments of the present techniques described herein make reference to the moveable element being a lens or lens element, the moveable element may be any object. For example, the present techniques could be used to move an image sensor, or could be used to move a moveable element that is arranged to provide haptic feedback.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A shape memory alloy actuation apparatus comprising:
a support structure;
a movable element supported on the support structure by a suspension system arranged to guide movement of the movable element along a movement direction with respect to the support structure, wherein the suspension system comprises a bearing arrangement configured to constrain movement of the movable element in degrees of freedom other than along the movement direction; and
two straight lengths of shape memory alloy actuator wire each connected by a crimp portion to the movable element and connected by a crimp portion to the support structure for driving movement of the movable element relative to the support structure, the two straight lengths of shape memory alloy actuator wire being inclined at an acute angle greater than 0 degrees with respect to a plane normal to the movement direction,
wherein the two straight lengths of shape memory alloy actuator wire are inclined such that one of the two straight lengths of shape memory alloy actuator wire drives movement of the movable element relative to the support structure in a first direction, and the other of the two straight lengths of shape memory alloy actuator wire drives movement of the movable element relative to the support structure in a second direction, where the second direction is opposite to the first direction.

2. The shape memory alloy actuation apparatus according to claim 1, wherein the two straight lengths of shape memory alloy actuator wire have an angle therebetween of less than 180 degrees as viewed along the movement direction.

3. The shape memory alloy actuation apparatus according to claim 2, wherein the two straight lengths of shape memory alloy actuator wire have an angle therebetween in the range from 70 to 110 degrees as viewed along the movement direction.

4. The shape memory alloy actuation apparatus according to claim 3, wherein the two straight lengths of shape memory alloy actuator wire have an angle therebetween of 90 degrees as viewed along the movement direction.

5. The shape memory alloy actuation apparatus according to claim 1, wherein the two straight lengths of shape memory alloy actuator wire are inclined at the same acute angle with respect to a plane normal to the movement direction.

6. The shape memory alloy actuation apparatus according to claim 1, wherein the two straight lengths of shape memory alloy actuator wire are inclined with respect to a plane normal to the movement direction in the same sense.

7. The shape memory alloy actuation apparatus according to claim 1, wherein the two straight lengths of shape memory alloy actuator wire are located on opposite sides of the movable element.

8. The shape memory alloy actuation apparatus according to claim 1, wherein the lengths of shape memory alloy actuator wire are each inclined at an angle in the range from 5 to 15 degrees with respect to a plane normal to the movement direction.

9. The shape memory alloy actuation apparatus according to claim 1, wherein the lengths of shape memory alloy actuator wire are each inclined at an angle in the range from 8 to 12 degrees with respect to a plane normal to the movement direction.

10. The shape memory alloy actuation apparatus according to claim 1, wherein the bearing arrangement comprises at least one bearing comprising bearing surfaces on the support structure and the movable element and at least one rolling bearing element disposed between the bearing surfaces.

11. The shape memory alloy actuation apparatus according to claim 10, wherein at least one of the support structure and the movable element is a moulded element and the bearing surface on the at least one of the support structure and the movable element is a surface of a metal insert disposed in the moulded element.

12. The shape memory alloy actuation apparatus according to claim 1, wherein the bearing arrangement comprises at least one plain bearing.

13. The shape memory alloy actuation apparatus according to claim 1, wherein the movable element is a lens element comprising at least one lens, wherein the movement direction is along an optical axis of the lens element, wherein the support structure has an image sensor mounted thereon, the lens element being arranged to focus an image on the image sensor.

* * * * *